W. M. McDOUGALL.
TRAIN GENERATOR AND DRIVING MECHANISM THEREFOR.
APPLICATION FILED JUNE 10, 1910.
1,007,221.
Patented Oct. 31, 1911.
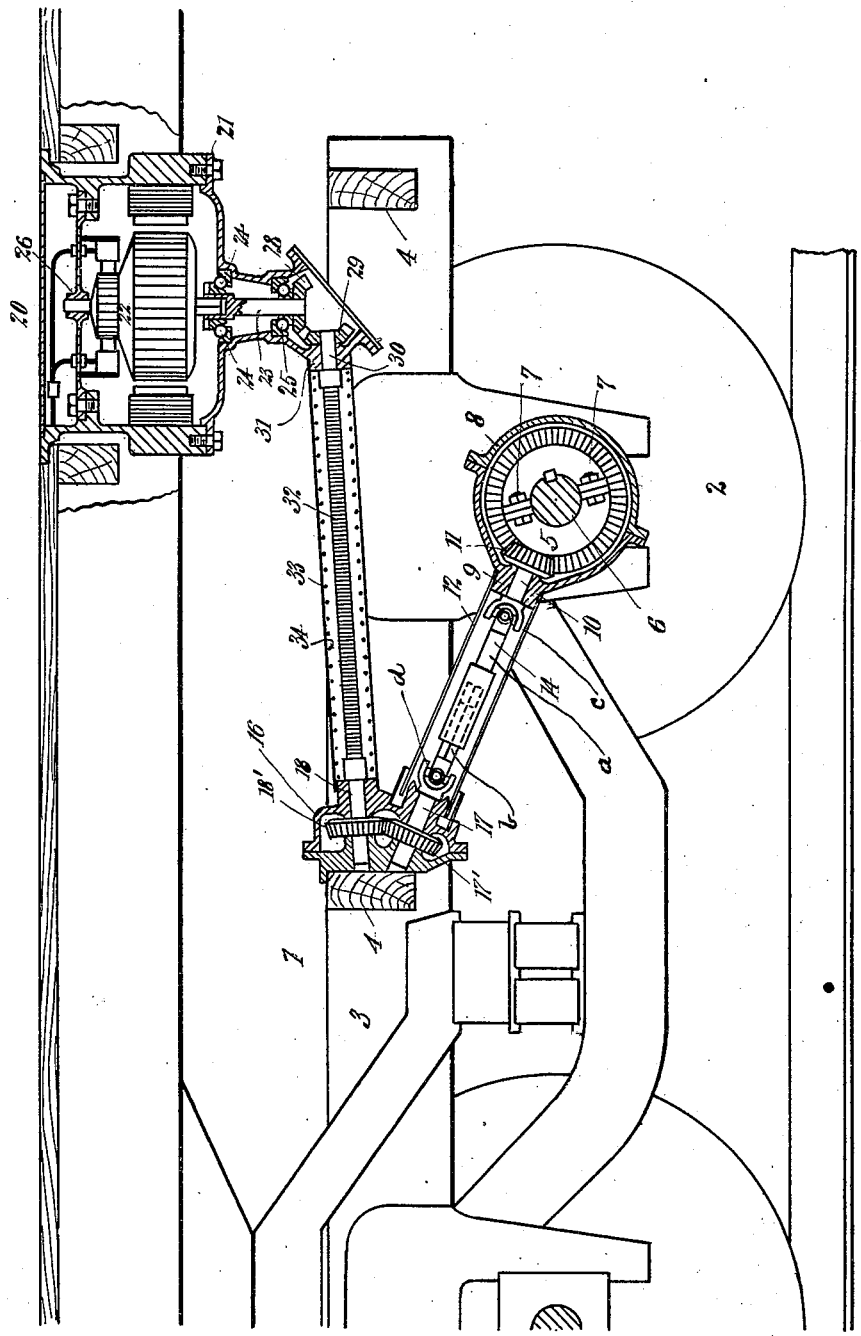
WITNESSES.
INVENTOR.
COLUMBIA PLANOGRAPH CO., WASHINGTON, D. C.

UNITED STATES PATENT OFFICE.

WILLIAM M. McDOUGALL, OF EAST ORANGE, NEW JERSEY.

TRAIN-GENERATOR AND DRIVING MECHANISM THEREFOR.

1,007,221.      Specification of Letters Patent.      Patented Oct. 31, 1911.

Application filed June 10, 1910. Serial No. 566,184.

*To all whom it may concern:*

Be it known that I, WILLIAM M. MC-DOUGALL, a citizen of the United States, residing at East Orange, in the county of Essex and State of New Jersey, have invented certain new and useful Improvements in Train-Generators and Driving Mechanism Therefor, of which the following is a full, clear, and exact description.

This invention relates to driving means for electric generators employed on trains for charging storage batteries and other purposes.

A common arrangement has been to mount the generator on one of the wheel axles. This arrangement, while simple, has the defect of exposing the generator to all the shocks and vibrations of the road, and also to the dust and grit which continually swirls around the truck and is very injurious to delicate mechanism. By my invention I inclose the generator within a permanent jacket or casing in the floor of the car body, and provide a form of driving connection from a wheel axle of the vehicle which not only permits all the free up and down and lateral swinging movements which necessarily take place in the truck, but furthermore is substantially dust proof, acting efficiently to keep all the dirt and dust of the road away from the wearing surfaces.

My invention is further designed to provide great rigidity in the bearing supports of the various intermeshing gears through which the power is transmitted. I employ an extensible jointed or Cardan shaft which transmits the power from a wheel axle of the train to a fixed gear box on the truck, and from this gear box the power is transmitted through a flexible shaft to one of a pair of intermeshing bevel gears on the car body and from which the generator is driven.

The drawing shows in side elevation, partly in section, a train generator and driving mechanism therefor embodying the principles of my invention.

Referring to the drawings in which like parts are designated by the same reference sign, 1 designates broadly a truck having the usual wheels 2 and frame beams 3, 4 of the usual kind, the beams 4 extending transversely across the body of the truck.

5 denotes a bevel gear transversely split or divided to permit it to be clamped upon the axle 6 of the wheel 2.

7 denotes bolts or screws by which the clamping is effected. This bevel gear 5 is inclosed in a casing 8 which also contains a bearing 9 for a shaft 10.

11 denotes a bevel pinion on the shaft 10 permanently in mesh with the bevel gear 5. The casing 8 also has a rigidly projecting tubular part 12 radially extending outward from the bearing of the shaft 10.

14 denotes a Cardan shaft of the usual or any desired sort joined to the shaft 10 and extending outward therefrom through the tube 12. The Cardan shaft 14 in this exemplification of my invention comprises telescoping members $a$ and $b$, and universal joints $c$ and $d$; member $a$ having a recessed end for the reception of $b$, while its other end is connected to shaft 10 by a universal joint $c$ and member $b$ is similarly connected by the universal joint $d$ to a shaft or arbor 17. The recess in the end of member $a$ is preferably square in cross section and the end of member $b$ which extends into said recess is also correspondingly squared, as indicated in the figure.

16 denotes a gear box containing shaft 17 and a similar shaft or arbor 18, on which shafts are respectively fixed the permanently intermeshing bevel gears 17', 18'. These gears are wholly inclosed by the gear box 16 which is adapted to be packed with grease in the usual way with gear mechanism of this sort.

20 denotes an electric generator which is inset or located in the floor or body of the car. This generator is housed in a hat-shaped or a pan-shaped casing 21, the armature 22 of the generator being coaxial with the axis of such casing and having a driving shaft 23 extending downward through the bottom of the said casing 21. At this side the armature shaft is journaled, preferably in the ball bearings 24, 25.

26 denotes an additional bearing for the armature on the top side thereof, this bearing forming part of a cover for the pan-shaped casing 21. The shaft 23 has a bevel gear 28 fixed thereto at its lower end and this bevel gear is in permanent mesh with a similar gear 29 on a shaft 30 journaled within a box or casing 31 forming part of the casing 21. The shaft 30 and the shaft or arbor 18 previously described are connected together by a flexible shaft connection 32.

33 denotes a canvas or other flexible tube joining the gear box 16 and the gear box 31 and inclosing the flexible shaft 32 so as to entirely exclude any dust, dirt or grit of the road therefrom. For purposes of illustration I have shown a spiral spring 34 inclosed within the canvas tube 33 and expanding the same outward away from the flexible shaft 32. Instead of a flexible shaft of this character I might employ any other form of non-rigid shaft.

The operation is as follows: When the train is moving on its trackway the axle 2 revolves, thereby correspondingly rotating the bevel gear 5 which is clamped upon the said axle. The rotation of this gear drives the bevel pinion 11 with its Cardan shaft 14 at a multipled speed ratio and this power is supplied to the bevel gears 17', 18', causing them to rotate and driving the flexible shaft 32 which is geared to the generator. It will be observed that in the preliminary parts of this transmission where the torque is of course most heavy, the transmission is made through a positively acting Cardan shaft which is strong and rigid and able to transmit large forces. The final part of the transmission where the power is lighter is made through a flexible shaft. In order to minimize the duty of this part, I have provided the generator with a ballbearing armature. These details of course may be varied or modified; for example plain or roller bearings may be used. From the standpoint of lubrication my system presents marked advantages, since it is only necessary to fill the gear box 16 with lubricant. This lubricant will gravitate downward through the tube 12 and supply the lower gear casing 8. Any suitable holes or cavities may be provided in the parts to facilitate this passage of the oil. The generator with its bearings requires little or no lubrication, but may be supplied with lubricant with great facility from the car body if desired.

What I claim, is:—

1. In a driving mechanism for a train generator, a truck having a wheel axle, a Cardan shaft positively driven from said axle, a gear box on the truck, a generator on the car body, a flexible shaft arranged to drive said generator, and intermeshing gears in said box respectively joined to said Cardan shaft and to said flexible shaft.

2. In a driving mechanism for a train generator, a truck having a wheel axle, a bevel gear on said axle, a Cardan shaft having a pinion meshing with said gear, a gear box on the truck, a generator on the car body, a flexible shaft arranged to drive said generator, and intermeshing gears in said box respectively joined to said Cardan shaft and to said flexible shaft.

3. In a driving mechanism for a train generator, a truck having a wheel axle, a Cardan shaft positively driven from said axle, a gear box on the truck, an incased generator inset in the floor of the car body, a flexible shaft having bevel gears arranged to drive said generator, and intermeshing gears in said box respectively joined to said Cardan shaft and to said flexible shaft.

4. In a driving mechanism for a train generator, a truck having a wheel axle, a Cardan shaft positively driven from said axle, a gear box on the truck disposed out of alinement with said axle, the axle being displaceable with respect to said box, a generator on the car body, a flexible shaft arranged to drive said generator, and intermeshing gears in said box respectively joined to said Cardan shaft and to said flexible shaft.

5. In a driving mechanism for a train generator, a truck having a wheel axle, a Cardan shaft positively driven from said axle, a gear box on the truck, an incased generator inset in the floor of the car body, a flexible shaft arranged to drive said generator, and intermeshing bevel gears in said box respectively joined to said Cardan shaft and said flexible shaft.

6. In a driving mechanism for a train generator, a truck having a wheel axle, a Cardan shaft positively driven from said axle, a gear box on the truck, a generator on the car body, a flexible shaft geared to drive said generator, and intermeshing gears in said box respectively joined to said Cardan shaft and to said flexible shaft.

7. In a driving mechanism for a train generator, a truck having a wheel axle, a bevel gear detachably mounted thereon, a Cardan shaft having a pinion driven from said gear, a gear box on the truck, an incased generator inset in the floor of the car body, a flexible shaft arranged to drive said generator, and intermeshing gears in said box respectively joined to said Cardan shaft and to said flexible shaft.

8. In a driving mechanism for a train generator, a truck having a wheel axle, a Cardan shaft positively driven from said axle, a rigid tube surrounding said Cardan shaft and maintaining the alinement thereof, a gear box on the truck, a generator on the car body, a flexible shaft arranged to drive said generator, and intermeshing gears in said box respectively joined to said Cardan shaft and to said flexible shaft.

In witness whereof, I subscribe my signature, in the presence of two witnesses.

WILLIAM M. McDOUGALL.

Witnesses:
WM. A. ROSENBAUM,
WALDO M. CHAPIN.

Copies of this patent may be obtained for five cents each, by addressing the "Commissioner of Patents, Washington, D. C."